(12) United States Patent
Cotoc

(10) Patent No.: US 11,080,583 B2
(45) Date of Patent: Aug. 3, 2021

(54) SYSTEM FOR BARCODE SCANNING AND RFID LABEL PRINTING

(71) Applicant: AVERY DENNISON RETAIL INFORMATION SERVICES, LLC, Mentor, OH (US)

(72) Inventor: Victor Cotoc, Loehne (DE)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/133,095

(22) Filed: Sep. 17, 2018

(65) Prior Publication Data
US 2019/0087702 A1    Mar. 21, 2019

Related U.S. Application Data

(60) Provisional application No. 62/559,224, filed on Sep. 15, 2017.

(51) Int. Cl.
| | | |
|---|---|---|
| *G06K 19/077* | (2006.01) | |
| *G06K 1/20* | (2006.01) | |
| *G06K 1/18* | (2006.01) | |
| *G06K 7/14* | (2006.01) | |

(52) U.S. Cl.
CPC ......... *G06K 19/07716* (2013.01); *G06K 1/18* (2013.01); *G06K 1/20* (2013.01); *G06K 7/1413* (2013.01); *G06K 7/1417* (2013.01); *G06K 19/0776* (2013.01)

(58) Field of Classification Search
CPC ............................................ G06K 19/07716
USPC ..................................................... 235/462.15
See application file for complete search history.

(56) References Cited

U.S. PATENT DOCUMENTS

| 5,382,779 A | 1/1995 | Gupta |
| 2007/0188306 A1 | 8/2007 | Tethrake et al. |
| 2013/0048711 A1* | 2/2013 | Burns .................. G06K 1/18 235/375 |
| 2014/0266633 A1* | 9/2014 | Marcus ............ G06K 7/10009 340/10.51 |
| 2018/0341440 A1* | 11/2018 | Gennaro .............. G06F 3/1209 |

FOREIGN PATENT DOCUMENTS

| EP | 1587018 | 10/2005 |

OTHER PUBLICATIONS

Invitation to Pay Additional Fees dated Jan. 7, 2019 issued in corresponding IA No. PCT/US2018/051336 filed Sep. 17, 2018.
(Continued)

*Primary Examiner* — Toan C Ly

(57) ABSTRACT

A system for processing barcode information provided by the user, which may be used to print and encode RFID-enabled product labels. The system may include a bar code scanner or may include a manual bar code entry interface such as a keyboard and mouse, and may be configured to output a label corresponding to a barcode once the barcode has been scanned, optionally with user customization by an operator and optionally including variable data provided through a variable data module. This system may allow for the calculation of EPC values, the tracking of serial values used in the printing process, exporting of the printing history, and printing and encoding of tag.

16 Claims, 14 Drawing Sheets

(56) References Cited

OTHER PUBLICATIONS

International Search Report and Written Opinion dated Mar. 4, 2019 issued in corresponding IA No. PCT/US2018/051336 filed Sep. 17, 2018.
CodePlex Archive, BarcodeWPF, https://archive.codeplex.com/?p=barcodewpf, at least as early as Mar. 2018.
Entity Framework 6, https://docs.microsoft.com/en-us/ef/ef6/?redirectedfrom=MSDN, Oct. 23, 2016.
WpfAnimatedGif, https://github.com/XarnlAnimatedGif/WpfAnimatedGif, at least as early as Jul. 2016.

* cited by examiner

| PRINT HISTORY | | | | |
|---|---|---|---|---|
| BARCODE | SERIAL NUMBER | EPC | QTY | BARCODE |
| 123456789012 | 000101 | 303401890040004000000065 | 1 | |
| 875785738490 | 000101 | 303435742448IE4000000065 | 1 | |
| 123354654487 | 000101 | 303407876831FEA00000000065 | 1 | |
| 123456789012 | 000102 | 3034078900400D4000000066 | 1 | |
| 123456789012 | 000103 | 3034078900400D4000000067 | 20 | |

| BARCODE | FILENAME | QTY | T200BARCODE | T20BCTYPE | T200ART_NAME | T200ART_NO | T200_CURRENCY |
|---|---|---|---|---|---|---|---|
| | SAMPLE RFID UNIT1 | 005 | 8675309666123 | | THE GO TO TEE | 37 20A 005 74DDLPV7 | |
| | SAMPLE RFID UNIT1 | 005 | 8675309666123 | | THE GO TO TEE | 37 20A 005 74DDLPV7 | |

< ADD-ONS

FIG. 9A

| BARCODE | FILENAME | QTY | T200BARCODE | T20BCTYPE | T200ART_NAME | T200ART_NO |
|---|---|---|---|---|---|---|
| [barcode] | SAMPLE RFID UNIT1 | 005 | 8675309666123 | | THE GO TO TEE | 37 20A 005 74DDUPV7 |
| [barcode] | SAMPLE RFID UNIT1 | 005 | 8675309666123 | | THE GO TO TEE | 37 20A 005 74DDUPV7 |
| [barcode] | SAMPLE RFID UNIT1 | 005 | 8675309666123 | | THE GO TO TEE | 37 20A 005 74DDUPV7 |

SYSTEM FOR BARCODE SCANNING AND RFID LABEL PRINTING

CROSS-REFERENCE TO RELATED APPLICATION(S)

The present application claims priority to and the benefit of U.S. Provisional Patent Application No. 62/559,224 filed Sep. 15, 2017, which is incorporated by reference herein in its entirety.

BACKGROUND

UPC barcodes, though now a ubiquitous part of modern life, took a significant amount of time to reach their current primacy. While the technology dates back to the late 1940s, and had matured to the point of usability in the mid-1960s, it took until the late 1970s for retailers to start adopting UPC barcodes in any significant quantity.

One of the main reasons for this was because of the significant initial investment in transitioning from manual entry of data to barcode scanning. In order for a barcode system to even be usable, a nontrivial number of items in the store had to actually have barcodes. In the best case, the UPC barcode would be printed on the item by the manufacturer. If this was not done, a retailer that wanted to make use of a barcode system would have been forced to have its employees manually tag items with UPC barcode stickers. The costs involved with paying employees to do this, and the costs of implementing an expensive barcode scanner, stalled adoption of the system. Further, at least initially, there was a high failure rate of the system; the ink on early barcodes could be smeared, rendering the barcode unusable and meaning that the product would have to be manually retagged.

In one study by IBM, it was determined that, in order to be cost-effective, a UPC barcode had to be printed on an overwhelming majority of all products by the manufacturer, with a seventy percent (70%) adoption rate being a low-end estimate. Even after this critical mass was reached in the mid-1970s, very few grocery stores or other retailers made plans to adopt barcode systems. BUSINESS WEEK published an article about how UPC technology was "The Supermarket Scanner that Failed" in 1976.

However, barcode adoption started quickly rising near the end of that decade. It was revealed that the detailed sales information that could be acquired by a barcode scanning system could dramatically improve inventory management and the responsiveness of the retail location to customer habits, needs, and preferences. As a result, after the first several weeks and first few restockings, sales were consistently around ten percent (10%) higher. Operating costs were likewise decreased. Based on this information, a much larger number of stores began adopting barcode technology; while there were around 200 deployed barcode scanning machines in total in 1977, by 1980 over 8,000 stores per year were converting to UPC barcode technology.

UPC barcode reading (and, where applicable, other types of barcode reading) are now mature, ubiquitous, and cost-effective technologies. Retailers are now faced with a new transition from barcodes to RFID technology, which offers even greater improvements in inventory tracking and management—and which presents many of the same hurdles as the initial adoption of barcodes. In particular, retailers that are interested in transitioning to RFID technology are finding that too few manufacturers have also transitioned and that too few products are RFID tagged to make a full switch. RFID tags also have a higher failure rate than might be desired; one study estimated that the failure rate of deployed RFID tags in the field might be as high as twenty percent (20%).

SUMMARY

A cost-effective and scalable solution for easily transitioning from a barcode system to an RFID tag system may be provided, in the form of an RFID label printing system. Such a system may integrate barcode scanning and RFID label printing in a manner that allows a user to scan or otherwise an existing UPC barcode or other barcode, automatically generate a RFID tag based on the barcode, print the generated RFID tag, and update the inventory system to reflect the printed RFID tag. This may allow a retailer to easily transition to an RFID-based inventory system by merely scanning one tag and replacing it with another. In some exemplary embodiments, a system for barcode scanning and RFID printing may also allow for the easy replacement of failed deployed RFID tags.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 5 is an exemplary embodiment of a print history table of a label printing system.

FIG. 6 is an exemplary embodiment of a print history export interface of a label printing system.

FIG. 9A is an exemplary embodiment of a variable data module interface of a label printing system.

FIG. 10 is an exemplary embodiment of a variable data module interface of a label printing system.

FIG. 11 is an exemplary embodiment of a label tag which may be generated by a label printing system.

DETAILED DESCRIPTION

Figure 1:
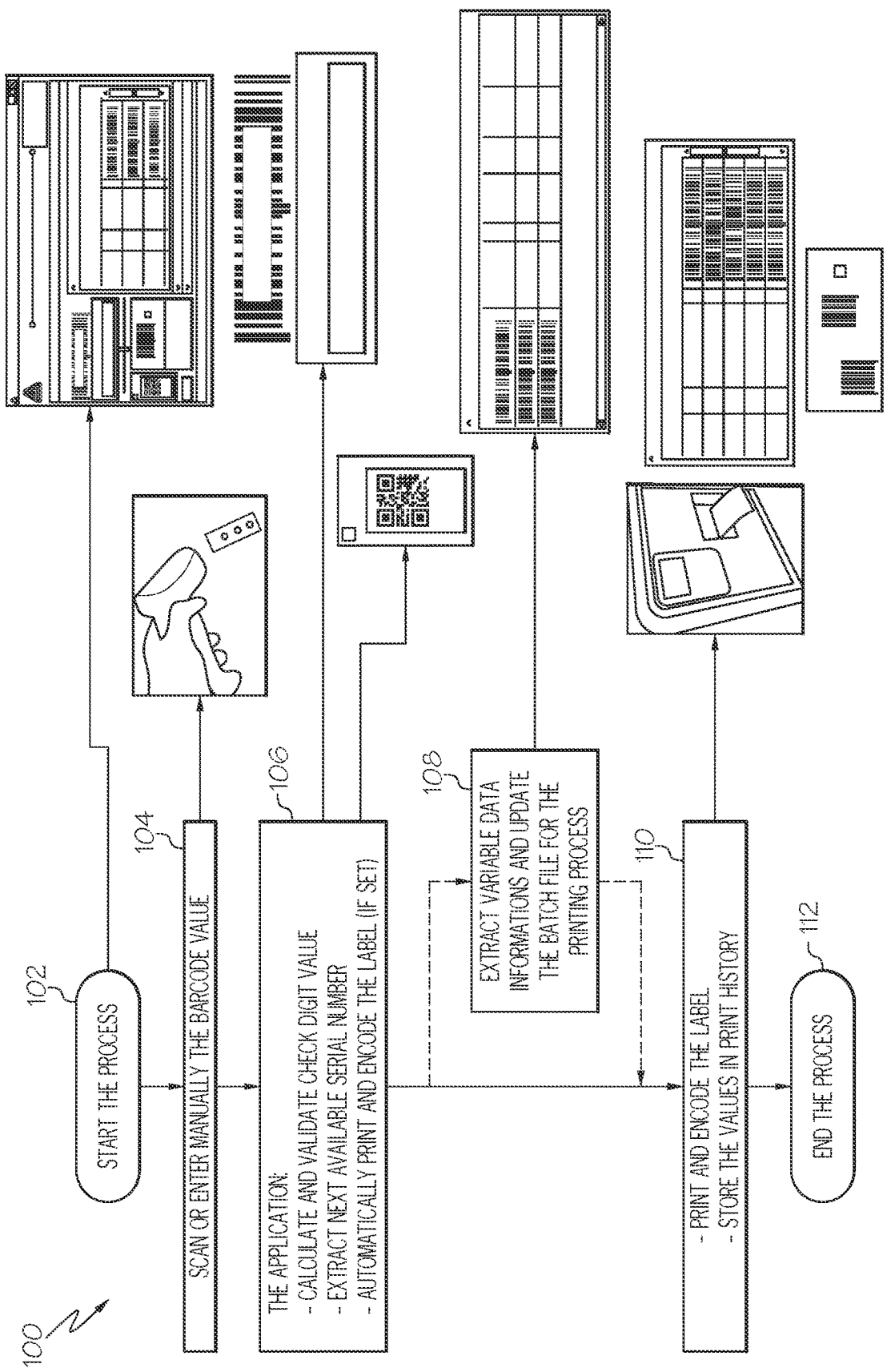
FIG. 1 is an exemplary embodiment of a process flow diagram depicting a method of using a label printing system.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of an RFID label printing system may be disclosed. Such a system may facilitate the rapid processing of barcode labels and the rapid printing of RFID tag labels based on those barcode labels. This may make it simple to transition from using one system to the other.

Exemplary embodiments of such a system may generally be configured to calculate Electronic Product Code (EPC) values, to keep track of the serial values that are used in the printing process, to compile and export a printing history report for tracking purposes, and to print and encode the tags that are used. In some exemplary embodiments, such a system may include an RFID tag label printer, such as an ADTP1 printer, and may include a barcode scanner by which the system can automatically scan barcode labels. In some exemplary embodiments, a system may have a keyboard interface by which a user may manually input barcode information, which may be provided instead of or in addition to a barcode scanner, such as may be desired.

Turning now to exemplary FIG. 1, FIG. 1 displays an exemplary embodiment of a process flow diagram depicting a method of using a label printing system 100. In a first step of an exemplary process 100, a user may start the process 102, for example by activating a label printing system and initiating an interface. In a next step, a user may input the barcode value 104, for example by scanning the barcode with a barcode scanner that is communicatively coupled with the label printing system, or by manually entering the barcode value, which may for example be done by keyboard entry.

In a next step 106, once the barcode value has been loaded into the system from an entry step 104, the system may be configured to or may automatically perform the steps of generating a corresponding RFID label for the product having the bar code that was scanned.

In an exemplary embodiment, the system may first calculate a check digit value and verify the calculated check digit value against a read check digit value. In some exemplary embodiments, this may be done when a barcode label is scanned, when a barcode value is manually entered, or both, as may be desired. In some exemplary embodiments, when the barcode label is a UPC barcode, the barcode may have a check value calculated according to the UPC standard, which may be calculated by, first, adding the digits in the odd-numbered positions (first, third, fifth, etc.) together and multiplying by three; second, adding the digits (up to but not including the check digit) in the even-numbered positions (second, fourth, sixth, etc.) to the result; and third, taking the remainder of the result divided by 10 (modulo operation) and if not 0, subtracting this from 10 to derive the check digit. In other exemplary embodiments, when the barcode is not a UPC barcode, a different check digit calculation may be used, or a different way of ensuring the accuracy of the data read by the barcode scanner (such as error correction regions on a 2D barcode) may be used.

In an exemplary embodiment, once the system has read or otherwise received the barcode value and has identified the product to which it corresponds, and has validated that the barcode was properly read, the system may then extract the next available RFID serial number for that product. The system may then print the label. In some exemplary embodiments, the system may perform the steps of printing and encoding the label automatically; in some exemplary embodiments, this may be a selectable option, such that a user can choose to have the system automatically print and encode the RFID label with the next available serial number, or can manually perform some steps of the process (such as verifying that all information is accurate) before choosing to print and encode the label.

In a next step 108, variable data may be extracted and combined with the data to be printed before a printing process is performed. For example, in some exemplary embodiments, it may be desired to add additional information to the label than what is available on the bar code, such as, for example, the size or color of an article of clothing. (For example, a UPC barcode for a T-shirt may include only product type information, and it may be desired to encode additional information such as the size and color of the shirt, in order to better manage product inventory. This may allow the business to more easily determine if, for example, T-shirts in a particular size or color are selling unexpectedly well.) In some exemplary embodiments, this variable data information may be manually entered or applied to the label data; in other exemplary embodiments, some or all of this variable data information may be automatically applied In a next step 110, the label may be printed and encoded, optionally automatically and optionally after variable data has been extracted and combined with the label information. In an exemplary embodiment, the values that were printed may then be stored in a print history data file, which may be stored locally or may be provided to a product tracking database. In a final step of the process 112, the process may end and the system may resume its original state, which may allow the process to be run again from the start 102.

Figure 2:
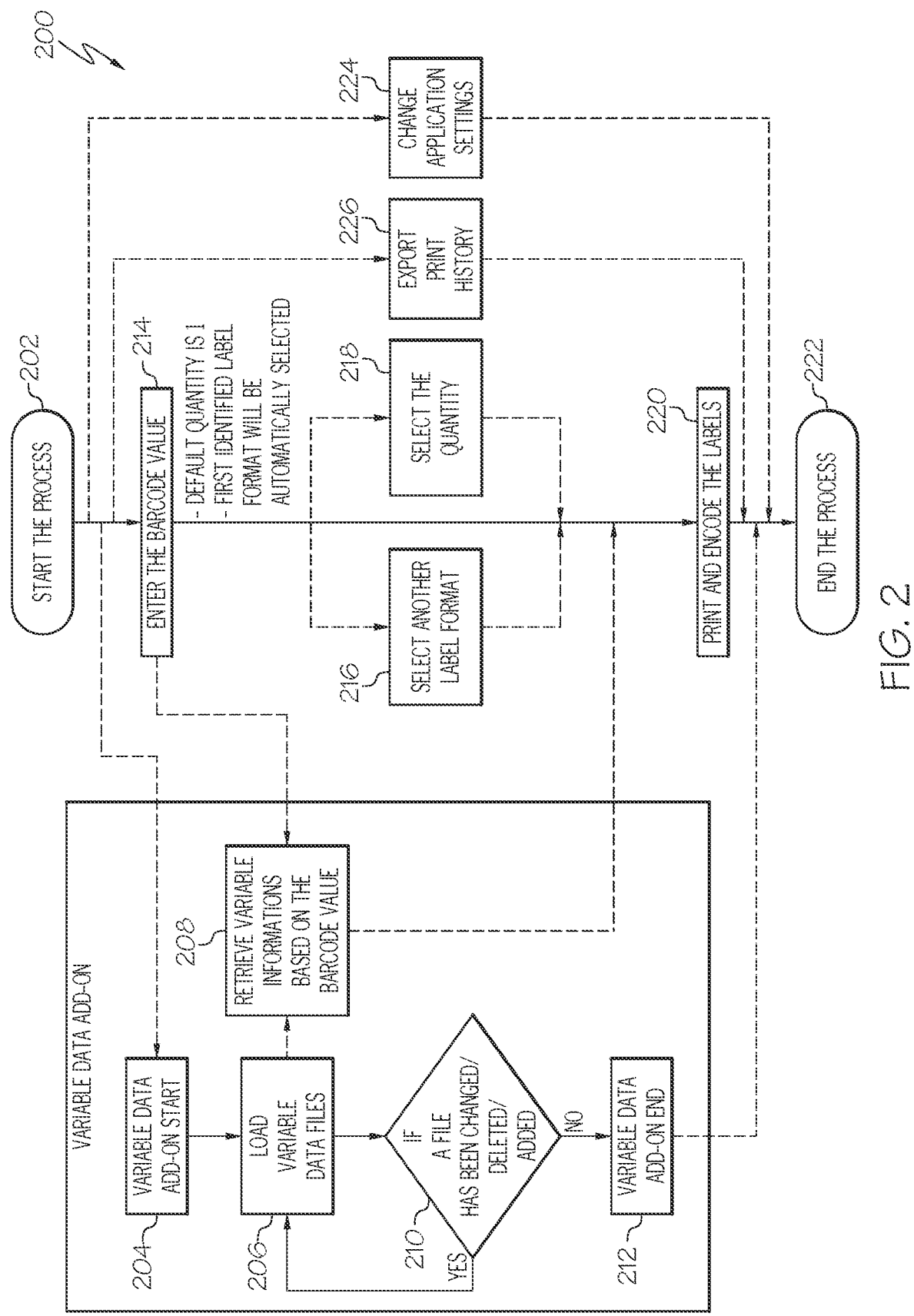
FIG. 2 is an exemplary embodiment of an application workflow diagram for a label printing system.

Turning to exemplary FIG. 2, FIG. 2 shows an exemplary embodiment of an application workflow diagram for a method of processing barcode information provided by a user in order to print and encode RFID-enabled product labels. In a first step, a user may start the process 202. From a starting point of the process 202, a user may be able to initiate a variable data add-on process 204, may be able to enter a barcode value 214, may be able to change the application settings 224, or may be able to export the print history. In some exemplary embodiments, certain features, such as a variable data add-on process 204, may optionally be presented.

In an exemplary embodiment, a user may begin by initiating a variable data add-on 204. In a first step of a variable data add-on process, one or more variable data files 206 may be loaded. The variable data add-on 210 may then periodically determine if a file has been changed, deleted, or added in the variable data files that have been previously loaded 206, and may update the variable data accordingly, by loading the new set of variable data files 206 and then continuing the variable data add-on process from that point. If no variable data files have been changed, added, or deleted 210, and there is no further interaction with the variable data, the variable data process 212 may end.

In an exemplary embodiment, while the variable data add-on is running (or, in an alternative embodiment, without running a variable data add-on if it is not desired to use one) a user may enter a barcode value 214, which may be obtained by scanning the barcode or may be obtained through manual entry. Once the barcode has been scanned or entered 214, the system may associate the barcode with a particular product or set of data, and may check to determine if there is any variable information corresponding to that barcode value. If there is any variable information that corresponds to that barcode value (for example, if the barcode is a product code for a T-shirt, the system may determine that size or color information may be associated with the shirt) the variable information may be retrieved and/or manually specified by the user 208, and the system may resume the label preparation process.

In some exemplary embodiments, the user may have the option to select a particular label format 216 or to select to print a certain quantity of labels 218. In some exemplary embodiments, a default number of labels may be initially configured to be printed, and a first identified label format in a list of label formats may be automatically selected. However, a user may be able to print more than one label, and in such an exemplary embodiment, the system may calculate a number of incrementing serial numbers available for a specified barcode and may calculate the EPC values that each successive label should have, and may then prepare the tags accordingly.

In some exemplary embodiments, after the user specifies a label format or a quantity (or after a default label format or quantity is automatically selected) variable data may be combined with the label information. In other exemplary embodiments, variable data may be combined with the barcode value data before a label format or quantity are determined, such as by the user, based on default data, or based on the variable data if desired; this may, for example, allow a user to generate multiple tags having identical variable information (for example, a number of shirts having identical sizes or colors) and print the multiple tags. As noted, in some exemplary embodiments, the variable data may restrict the available options for the selection of a label format 216 or a quantity 218; for example, according to an exemplary embodiment, the introduction of variable information may be specific to a particular product having a barcode value and the system may allow only a single unique label to be printed, and according to another exemplary embodiment certain label types may be incompatible with certain types of products and the variable information may restrict these label types from being paired with these types of products.

Once the label data has been compiled, including variable information 208 if desired and including a type and quantity of labels, a user may be able to print and encode the labels 220, or the labels may be automatically printed and encoded 220, for example if an option to automatically print labels is selected. Once the labels are printed and encoded 220, the process may end 222, optionally looping back to the start 202 if more barcode values are to be entered.

In an exemplary embodiment, a user may be able to export the print history 226 and change certain settings of the system 224, such as whether labels are automatically printed and encoded or not, after initiating the process 202. For example, according to an exemplary embodiment, a user may select an option to export the print history 226, which may be, for example, exported in the form of a data file which may be output to a connected drive, may be automatically transmitted to a product tracking database via an Internet connection, or may be otherwise exported. In an exemplary embodiment, this may instead be performed automatically, or may optionally be performed automatically or may be performed automatically under certain conditions; in some exemplary embodiments, these may be customizable application settings, if desired.

Figure 3:
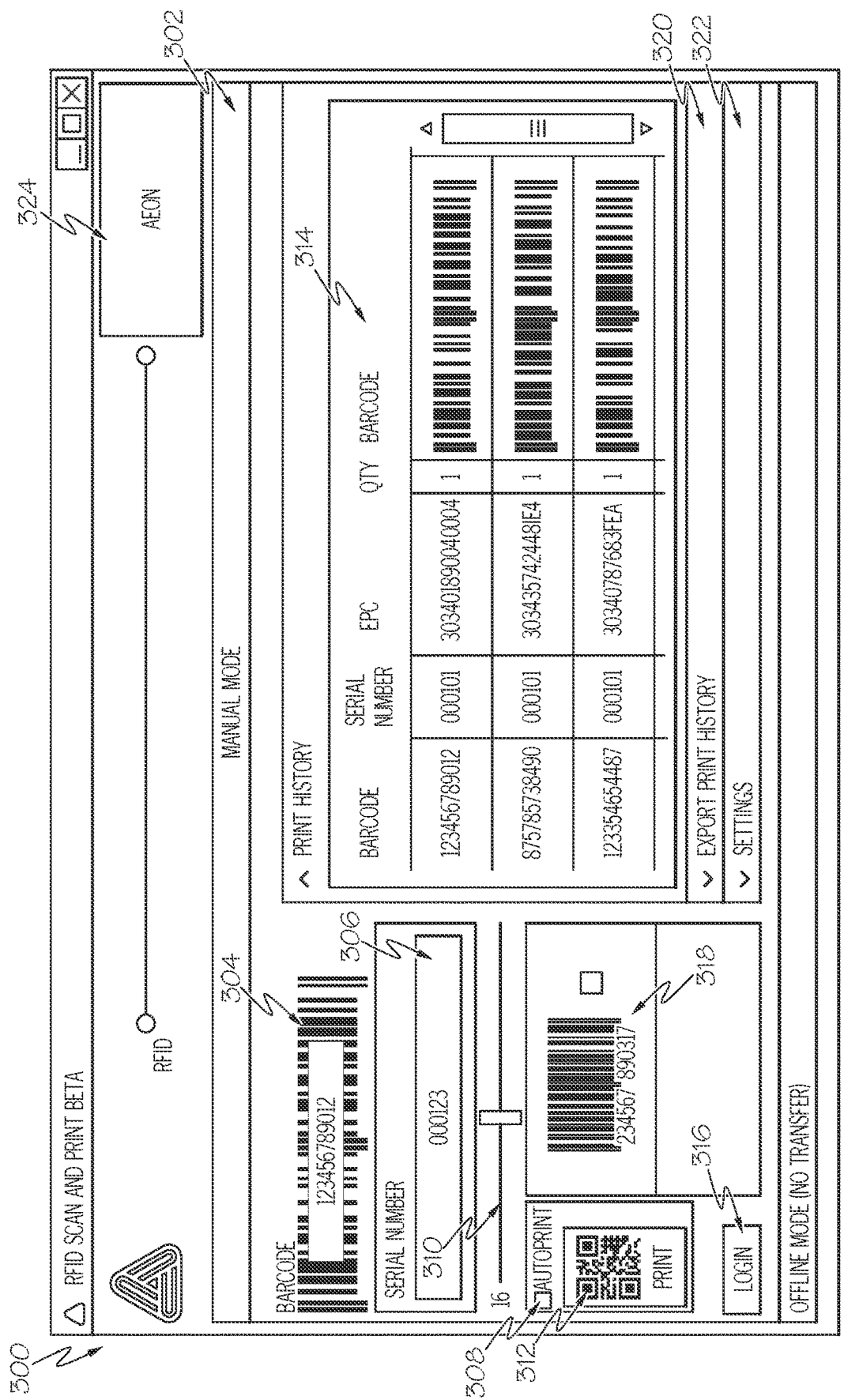
FIG. 3 is an exemplary embodiment of a user interface for a label printing system.

Turning next to exemplary FIG. 3, FIG. 3 displays an exemplary embodiment of a user interface for a label printing system 300, which may have features including (but not limited to) some or all of the following. In an exemplary embodiment, a user interface 300 may allow a user to operate the system in manual mode, in which the user may automatically enter barcode data, or may allow a user to operate the system in scanning mode or automatic mode, in which the user may operate a barcode scanner to scan barcode information. Other modes may be accessible, if desired.

In an exemplary embodiment of an interface 300, a barcode field 304 may be displayed on the interface, shown here in the upper left-hand corner of the interface. In an exemplary embodiment, in a manual mode, a barcode field 304 may have an editable text box in which a user may manually enter barcode information, and in a scanning or automatic mode, a barcode field 304 may have a text box in which barcode information may be displayed after being scanned.

In an exemplary embodiment of an interface 300, a serial number field 306 may be displayed, for example under the barcode field 304 or elsewhere on the interface 300. According to an exemplary embodiment, once a barcode has been scanned or manually entered into a barcode field 304, a next available serial number for the specified barcode may be generated and supplied to the user in the serial number field 306.

In an exemplary embodiment, an interface 300 may provide the user with an autoprint option 308, by which the system may be configured to automatically print RFID labels 308 once all necessary information has been input. This may be, for example, a check box or other such toggle, as may be desired, or may allow further customization of rules defining when automatic printing should be performed and when it should not be performed.

In an exemplary embodiment, an interface 300 may have a quantity selector 310, by which a user can select an appropriate quantity of labels to be prepared. In an exemplary embodiment, this may be, for example, a slider, or may be any other input option, such as a text field or drop-down menu, as may be desired.

In an exemplary embodiment, an interface 300 may have a print button 312. According to an exemplary embodiment, when the user has deselected an auto-print option 308, a user may instead initiate printing by selecting the print button 312. In some exemplary embodiments, a print button 312 may feature a barcode, which may be scannable by a barcode scanner in order to activate the print button 312, if desired. In some exemplary embodiments, this may be a static barcode (such as a static 2D barcode), while in other exemplary embodiments, this barcode may be dynamically generated. For example, if the system is designed to be used with multiple barcode types, such as UPC and 2D barcodes, the print button 312 may be provided with a barcode matching the type of scanner that is coupled to the system. In some exemplary embodiments, once a print job has been initiated, a "print" button 312 may double as a "cancel printing" button which may be selected to cancel a current print job, such as may be desired.

In an exemplary embodiment, a print history table 314 may be provided, which may show a recent history of barcodes that have been scanned and label information for the labels that have been printed. For example, according to an exemplary embodiment, a print history table 314 may show a barcode number that had previously been scanned or entered, a serial number prepared based on that barcode number, an EPC code generated for that label, a quantity of labels printed, and a visual representation of the barcode printed. In some exemplary embodiments, a print history table 314 may allow a previous print job to be duplicated (for example, if a defective RFID label has failed or otherwise needs to be repaired, it may be desired to reprint the label having the same information) or may allow the barcode used in a previous print job to be duplicated (for example, if it is desired to print more labels for a particular product having an identical UPC barcode). According to an exemplary embodiment, once a print button 312 has been selected or a printing process has been automatically triggered, the print history table 314 may be automatically updated once it is verified that the printing process has successfully completed. In some exemplary embodiments, it may likewise be desirable to log failed print jobs as well as successful ones, so that, for example, any problems with the printer or scanner can be more easily diagnosed.

In an exemplary embodiment, an interface 300 may provide an option for one or more logs to be retrieved 316. These logs may include, for example, the print history logs shown in the print history table 314, or may be any other logs such as usage logs of the system, such as may be desired.

In an exemplary embodiment, an interface 300 may provide an option to customize the format of a label to be prepared 318. In an exemplary embodiment, a user may, for example, select a format of a label to be prepared by selecting the option 318, which may provide a menu of labels for the user to select from. The format selection option 318 on the interface may then display a preview of the label to be printed, if desired.

In an exemplary embodiment, an interface 300 may provide an option to export the print history 320 of the system. This may export the entire print history of the system, or may provide the user with an option to selectively export the print history. For example, according to an exemplary embodiment, a user may be able to export the print history over a particular time period, or may be able to search the print history by a keyword, label type, particular barcode number, and so forth and selectively export the search results.

Finally, in an exemplary embodiment, a settings menu 322 may be available, through which the user may be able to change one or more settings.

In an exemplary embodiment, the interface 300 may be usable with a set of standard computer controls, such as a mouse and keyboard, or touch-screen interface. In another exemplary embodiment, the interface 300 may be usable with a barcode scanner (such as a standard UPC barcode scanner or a 2D barcode scanner) which may be integrated with the system and which may be used to input data into the system. In some exemplary embodiments, a barcode scanner may be usable as or may include a controller for the interface (instead of or in addition to a mouse and/or keyboard), if desired.

In some exemplary embodiments, a system may start automatically in scanner mode, such that the system will automatically print an RFID label when the user scans a barcode with the barcode scanner. In some exemplary embodiments, a user may be able to switch to manual mode by clicking anywhere in the application (such as a barcode field, a quantity selector, a print history, or elsewhere as may be desired) with a mouse or touch screen interface. The user may then be able to switch back to scanner mode, which may be done by clicking the "manual" mode bar 302. In other exemplary embodiments, the system may start in a "manual" mode and be switchable to a scanning or automatic mode, or may start up according to any other logic that may be desired. For example, a system may be configured to start in a scanning mode when a UPC barcode scanner is coupled to the system, but may be configured to start in a manual mode when no UPC barcode scanner is detected.

Figure 4:
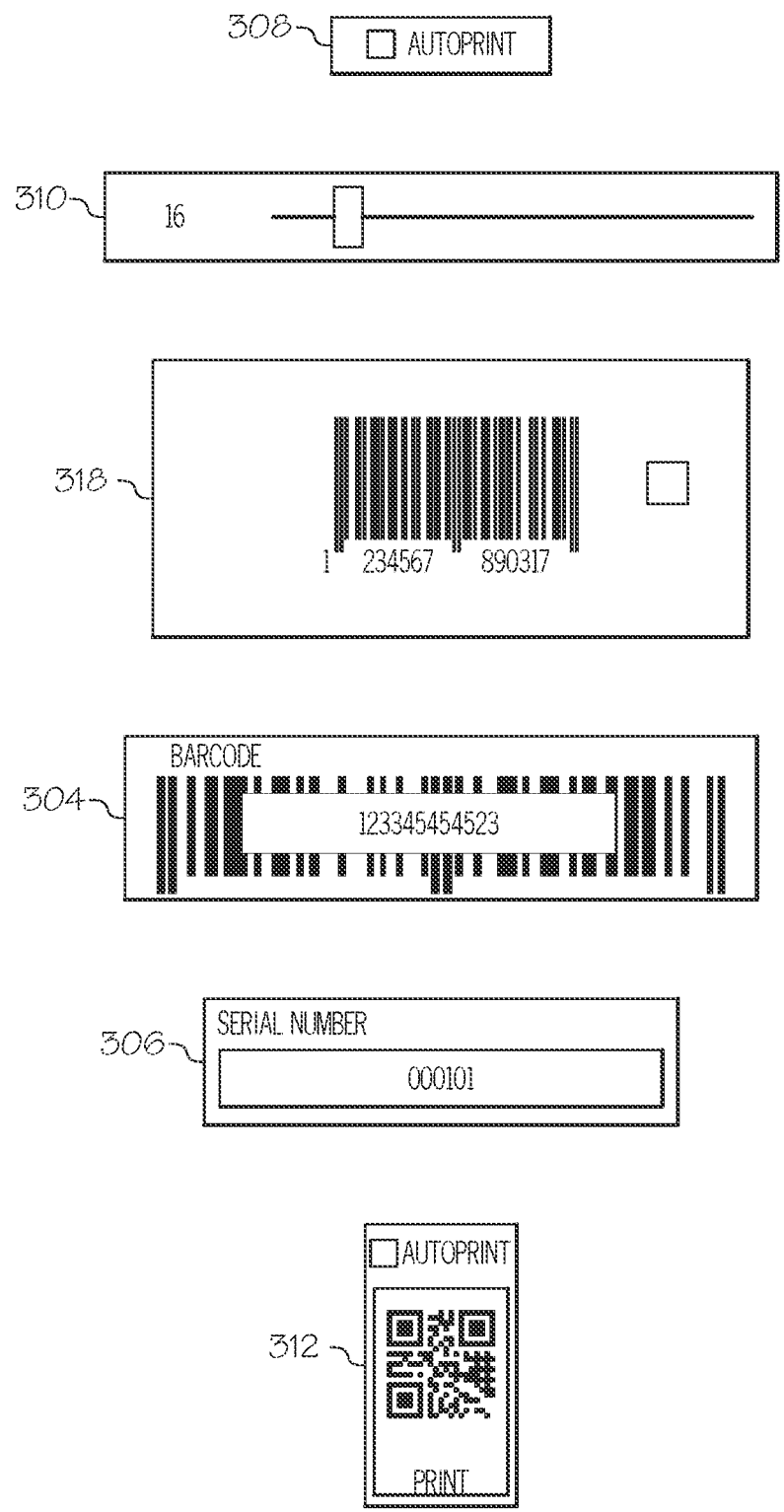
FIG. 4 is an exemplary embodiment of a set of selectable elements which may be displayed on a user interface of a label printing system.

Turning now to FIG. 4, each of several components of the exemplary interface 300 shown in FIG. 3 may be shown and described in further detail. According to an exemplary embodiment of an autoprint selector 308, a user may select how the application will react to a new barcode value by checking or unchecking the autoprint option 308. By checking the autoprint option 308, the system may be configured to automatically print a new label. By unchecking the autoprint option 308, the system may be configured to wait for the operator to activate the printing function.

According to an exemplary embodiment of a quantity selector 310, a quantity selector 310 may provide a default selected quantity of one (1). As such, if the operator does not adjust the default selected quantity by adjusting the quantity selector 310, one label may be printed. If a different number is selected, then a higher number of labels may be printed.

According to an exemplary embodiment of a format selector 318, an operator may be able to select from two or more formats, if any alternative formats are available. In another exemplary embodiment, only one format may be loaded into the application or may be available for a particular profile, and as a result the format selector 318 may automatically select this format and may not be selectable in order to change the format to a different format.

According to an exemplary embodiment of a barcode field 304, a user may be able to manually enter a desired barcode value in the field, or may scan the barcode directly from the label if a scanner is available. (In an exemplary embodiment, a user may also be provided with the option to edit a barcode that has been scanned, for example if it is determined by the user that the barcode has been misread by the scanner due to some kind of damage to the barcode. In an exemplary embodiment, once the barcode is specified, the system may be configured to automatically display the barcode lines behind the barcode field 304, such that the user may be able to visually compare the barcode on a scanned or read barcode label and the barcode shown on the screen, if this is desired.

According to an exemplary embodiment of a serial number field 306, once the barcode is specified, the system may be configured to automatically generate or retrieve a new serial number, and may then display this new serial number in the serial number field 306.

According to an exemplary embodiment of a print button 312, after a barcode value has been entered, based on the user's selection in the autoprint selector 308, the system can start printing the labels automatically, or may wait until the operator has first activated the printing process. In some exemplary embodiments, the printing process may be activated by clicking on the print button 312 with a mouse; in some exemplary embodiments, the printing process may be activated by scanning the print button 312 with a barcode scanner (such as a 2D barcode scanner) directly from the screen.

Turning now to exemplary FIG. 5, FIG. 5 shows an exemplary embodiment of a print history table 314. According to an exemplary embodiment, a print history table 314 may provide a full history of printed labels, which may include, for example, the barcode that was printed 510, a barcode value 502, a calculated serial number for the printed label 504 or a starting serial number of a group of printed labels 504, an encoded electronic product code (EPC) number 506 or starting EPC number 506, and a quantity of labels printed 508. In some exemplary embodiments, print jobs having more than one printed label may be logged as a single print job having a higher quantity (such as a quantity of 20 as shown in exemplary FIG. 5) or may be logged as individual print jobs in the print history table 314 such that each printed label can be clearly and unambiguously associated with a single serial number 504 and EPC 506.

Figure 6:
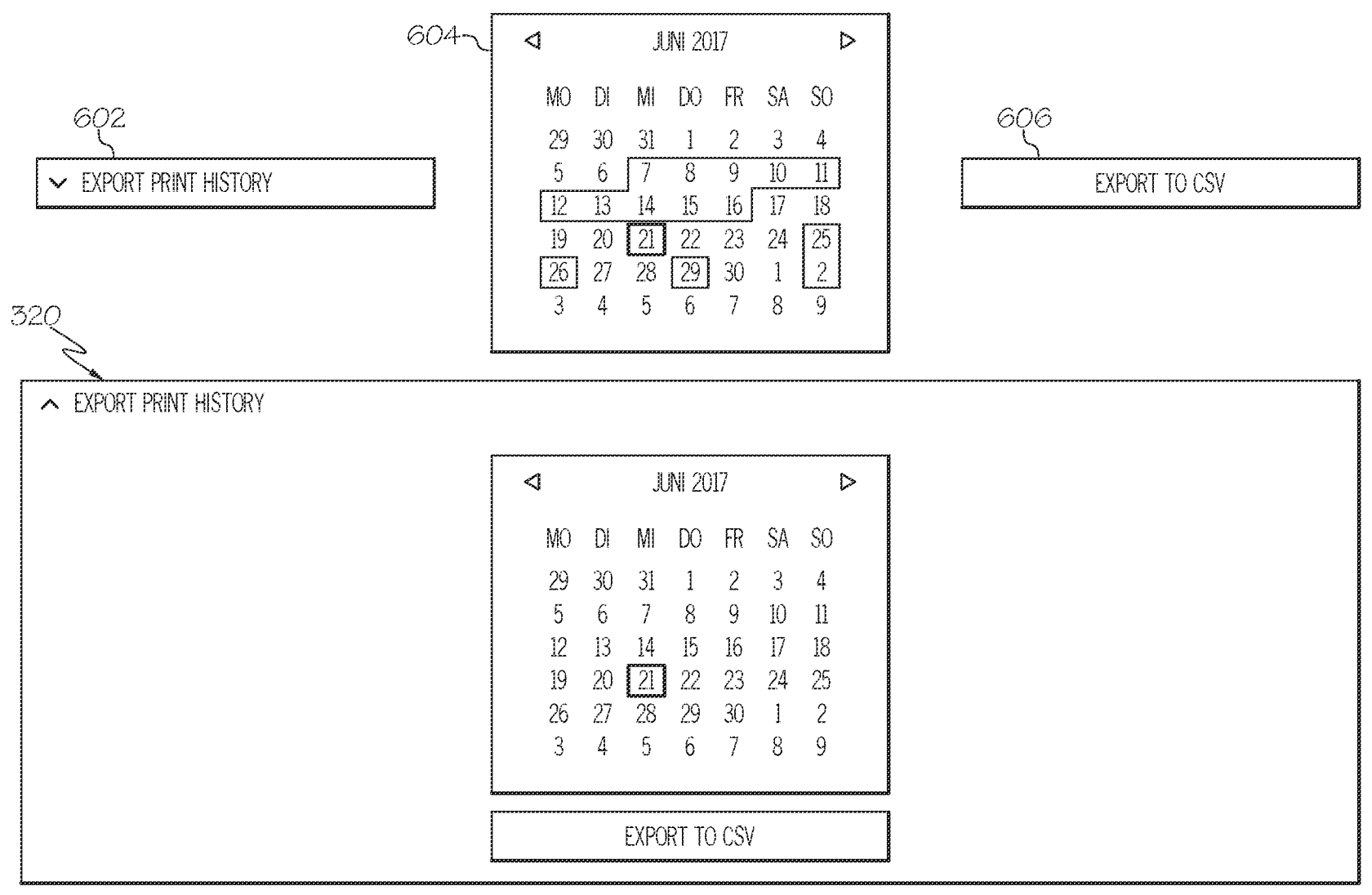

Turning now to exemplary FIG. 6, FIG. 6 shows an exemplary embodiment of an export print history dialog 320. According to an exemplary embodiment, in order to activate an export print history dialog 320, a user may select an option 602 to expand the export print history dialog 320 on the main interface 300. In an exemplary embodiment, once clicked, the export print history dialog 320 may automatically expand or may otherwise be displayed.

According to an exemplary embodiment, an export print history dialog 320 may allow a user to export the entire print history of the system or may allow a user to export only a portion of the print history of the system. For example, according to an exemplary embodiment, an export print history dialog 320 may allow a user to select a range of dates for which the print history of the system should be exported.

For example, according to an exemplary embodiment, a calendar may be provided 604 over which the user may be able to select a date or range of dates for which the print history should be exported. In some exemplary embodiments, a user may be able to select multiple separate dates or separate periods over which a print history should be accessed and exported; for example, a user may be able to export the print history for successive Tuesdays by selecting each Tuesday. In an exemplary embodiment, the calendar may indicate the current date by displaying it in a first color (for example, dark gray), may indicate one or more selected days by displaying them in a distinguishable second color (for example, light blue). In an exemplary embodiment, in order for the user to select a period, the user may click on the start or end date for the period, and while keeping the mouse button pressed, move the mouse to the other of the start or end date of the period. In an exemplary embodiment, the user may select multiple dates, by pressing and holding the CTRL key or another key and selecting each date individually or as a period such as may be desired. In an exemplary embodiment, a user may be able to deselect a date, multiple dates, or all dates through one or more provided options; for example, the user may be able to deselect all selected days by right-clicking the mouse button.

In an exemplary embodiment, a user may be provided with other options that they may use to customize the print history to be exported. For example, a user may be able to select certain times as well as dates over which the print history may be exported; for example, it may be desirable to export all of the print history over a time period corresponding to the shift of a particular retail worker (for example, from 2:00 to 10:00 PM on one particular day, or on several successive days) in order to evaluate the performance of that retail worker. Other options may also be provided to customize the print history; for example, a user may be able to narrow it by particular barcode types or may be able to execute one or more searches to narrow the print history, if desired.

In an exemplary embodiment, an "export" button 606 may be provided that a user may select in order to export the print history over the selected date or set of dates. In an exemplary embodiment, the print history may be exported as a particular file format, such as, for example, CSV; in another exemplary embodiment, the user may be able to customize the file format in which the print history may be provided.

In an exemplary embodiment, a user interface may be associated with one or more particular companies, and may be customized so as to have different settings, default settings, or available options when one particular company is selected as compared with another particular company. For example, according to an exemplary embodiment, a user interface of a system may be associated with the AEON company 324, a grocery retailer. In an exemplary embodiment, the same system may be intended for use on the products of a different grocery retailer as well as the AEON company's products 324. In such an exemplary embodiment, a user may specify a company name or company profile, which may automatically load the settings associated with that company name or company profile. (For example, a particular company may have a first desired default label type, and another company may have a second default label type distinguishable from the first label type.) In other exemplary embodiments, a user may be able to select between any other settings profiles other than company-specific settings profiles, such as may be desired.

Figure 7:
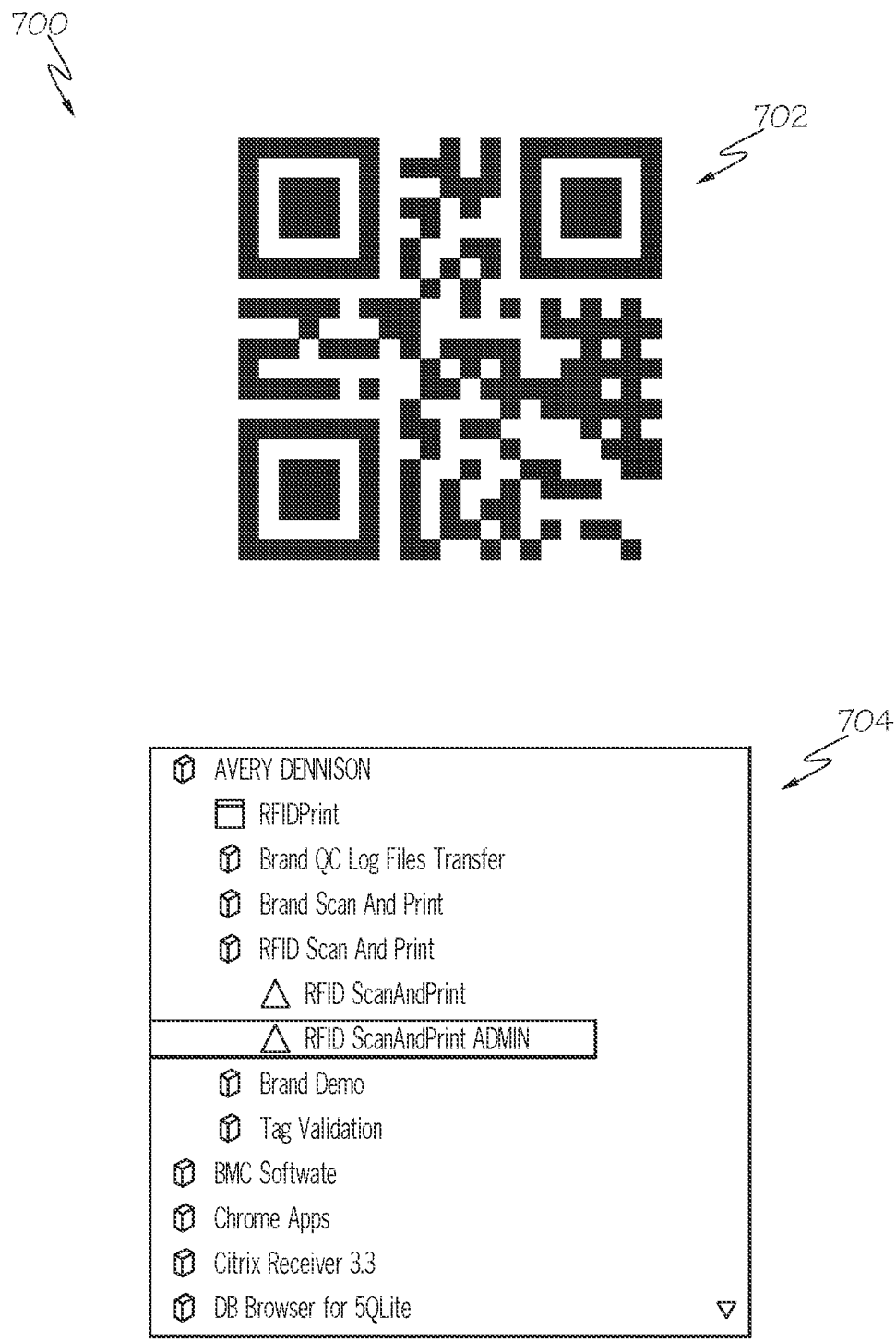
FIG. 7 is an exemplary embodiment of an administration interface of a label printing system.

Turning now to exemplary FIG. 7, FIG. 7 may display an exemplary embodiment of an administration interface 700 of a label printing system.

According to an exemplary embodiment, a settings menu 322 of an interface 300 may be provided under an expander. However, the settings menu 322 may be blocked or disabled during the normal operation of the system, and the system may have to be provided with the appropriate administrator credentials before the settings menu 322 will be activated and the settings can be adjusted.

For example, according to an exemplary embodiment, a settings menu 322 may be enabled by changing the application into an administrator mode by providing appropriate administrator credentials, for example through a keyboard input. In some exemplary embodiments, this may be done by, for example, a username and/or password input. In other exemplary embodiments, administrator username and/or password information may be stored in the form of a scannable barcode, for example an administrator QR code 702 or other 2D barcode. In order to change the application into administrator mode, the user may scan the administrator code 702 with a barcode scanner. (In some exemplary embodiments, a user may likewise scan a barcode to provide other levels of authorization to the system; for example, in an exemplary embodiment, a user may scan a QR code or other barcode on an ID tag in order to log into the system or export data from the system, and the system or relevant parts of the system may otherwise be disabled or limited.)

In another exemplary embodiment, a user may be able to launch an administrator mode like a standard application, by, for example, opening a menu 704 and selecting a separate "administrator" program. In some exemplary embodiments, a user may have to provide credentials in order to access this program, or may not have access to this program under normal circumstances (it may, for example, be available on an external drive carried by a manager or otherwise be made unavailable, if desired).

Once the user has enabled an administrator mode, or has otherwise provided credentials to the system, the settings menu 322 may be unlocked and some or all of the settings in the settings menu 322 may be made adjustable. This menu may be shown in more detail in, for example, exemplary FIGS. 8A to 8D.

Figure 8A:
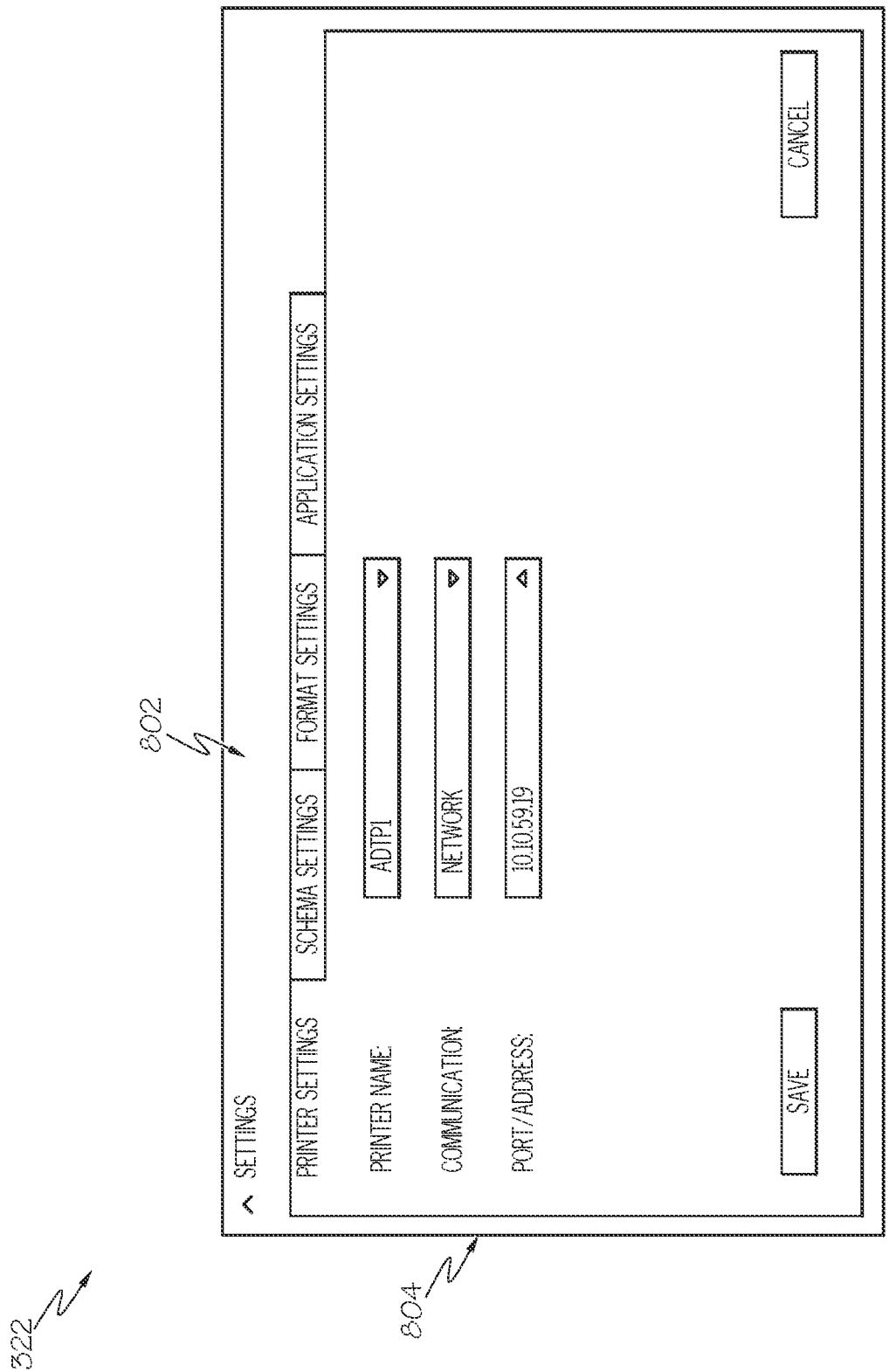
FIG. 8A is an exemplary embodiment of a settings menu interface of a label printing system.
Figure 8B:
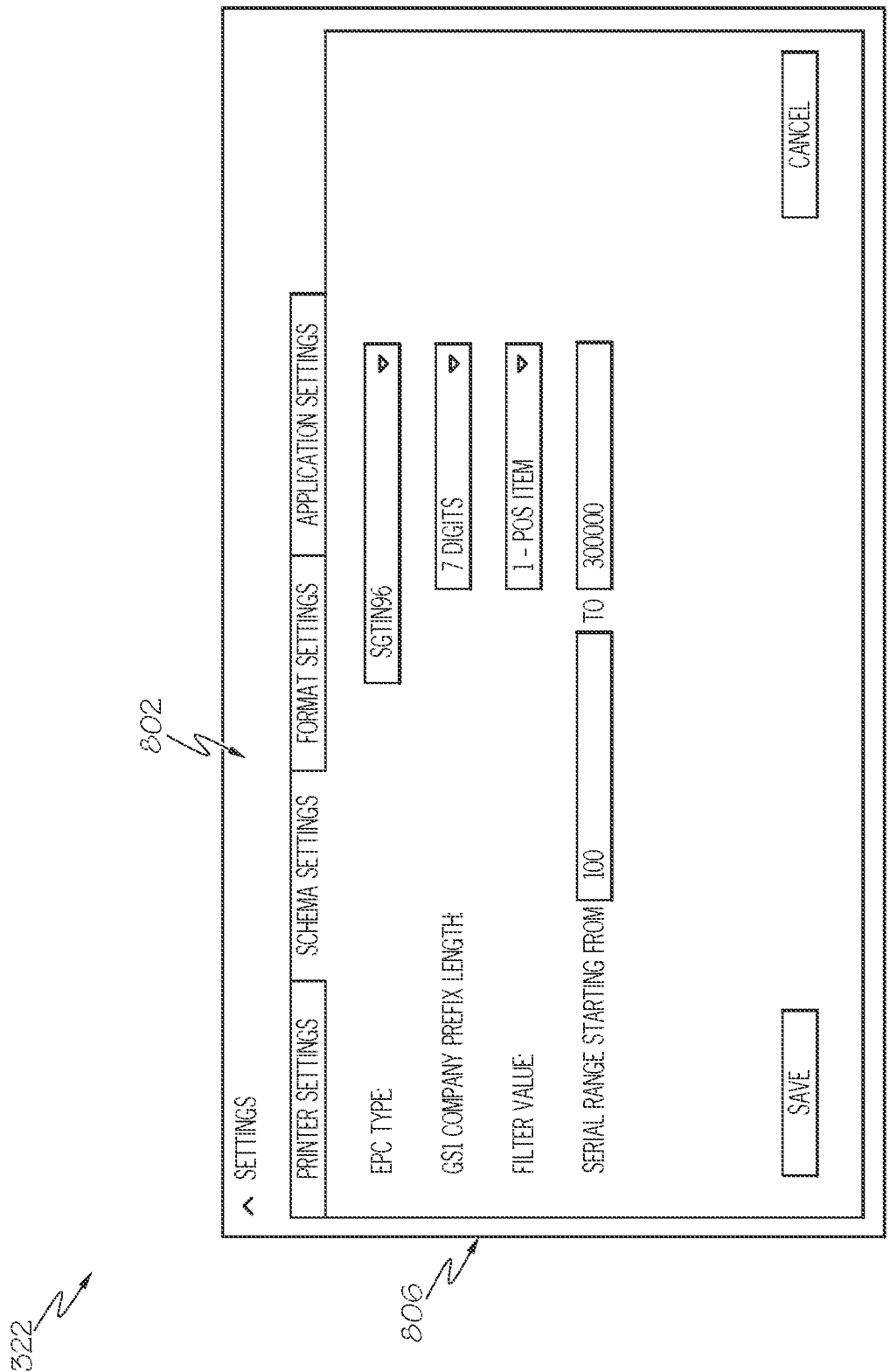
FIG. 8B is an exemplary embodiment of a settings menu interface of a label printing system.
Figure 8C:
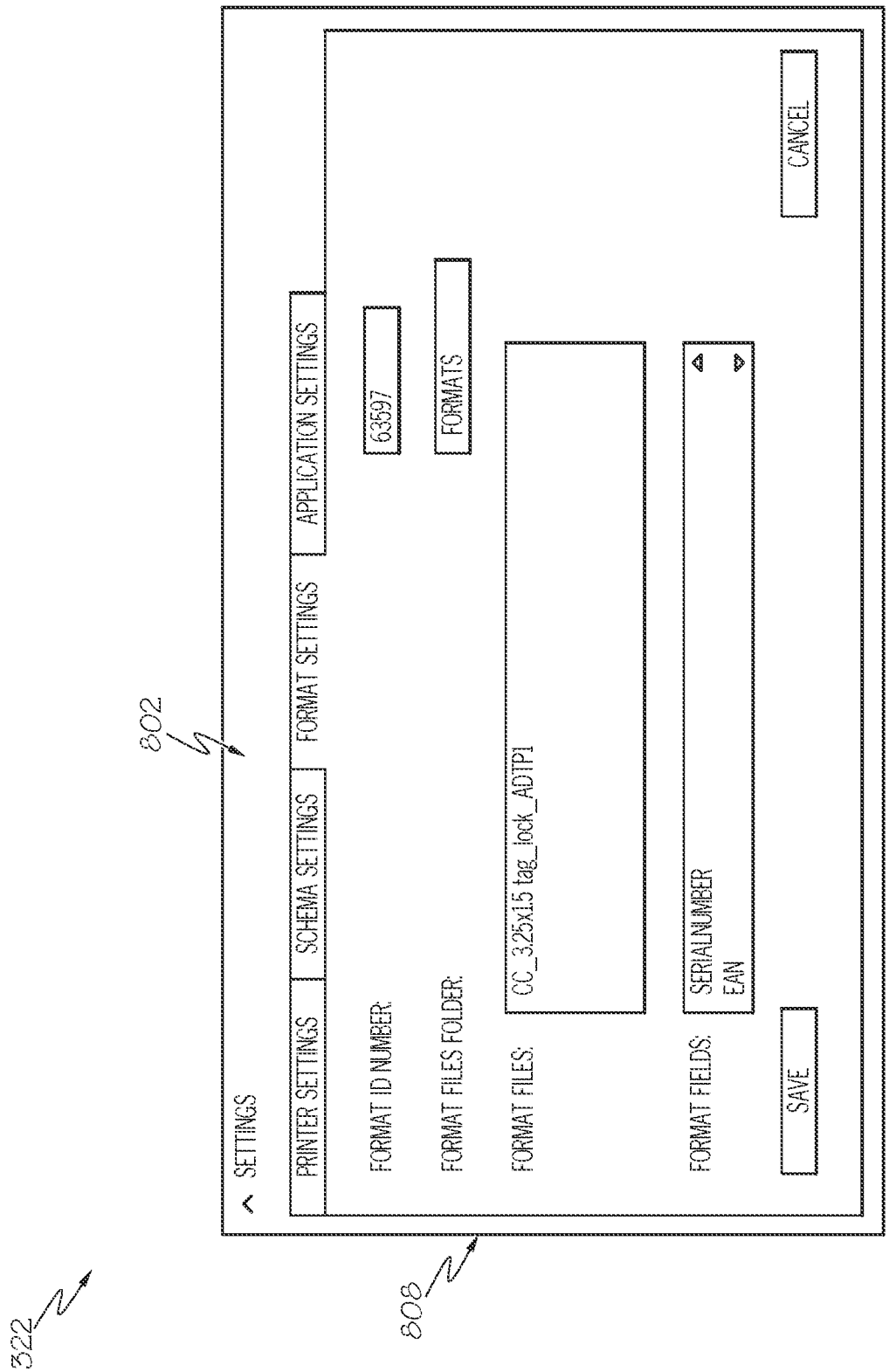
FIG. 8C is an exemplary embodiment of a settings menu interface of a label printing system.

FIG. 8A shows an exemplary embodiment of a printer settings interface component 804 of a settings menu 322. Likewise, FIG. 8 shows an exemplary embodiment of a schema settings interface component 806 of a settings menu 322, FIG. 8C shows an exemplary embodiment of a format settings interface component 808 of a settings menu 322, and FIG. 3D shows an exemplary embodiment of an application settings interface component 810 of a settings menu 322. In some exemplary embodiments, a user may be able to select between these settings menu components by, for example, selecting a tab 802 at the top of the settings menu 322, or otherwise selecting between the components as may be desired.

Looking first at exemplary FIG. 8A, a printer settings interface component 804 may allow a user to customize which printer may be coupled to the system, and how the printer may be used. For example, in an exemplary embodiment, an ADTP1 RFID label printer may be used, and communication may take place over a network connection via the specified port or address (or via a local connection or any other type of connection that may be desired). In an exemplary embodiment, when the printer is instead a serial printer, the settings menu 322 may update to provide a COM number space instead of a port/address space.

Looking next at exemplary FIG. 8, a schema settings interface 806 may be provided, through which a user may be able to change the EPC schema definition used by the system. For example, a user may be able to specify an EPC type to be used by the system; for example, the system may be configured to use GDT96, GSRN96, SGTIN96, SSCC96, SGLN96, GRAI96, GIAI96, or GID96, or any other EPC types that may be desired. In another example, a user may be able to customize the GS1 Company Prefix, which may be provided over a range of lengths; for example, this may be set to be a value between 6 and 12 digits.

In another example, a user may be able to customize the filter value of the EPC, which may be, for example, a value between 0 and 7. In an exemplary embodiment, a value of 1 may indicate a point of sale item, a value of 2 may indicate case, a value of 3 may be reserved, a value of 4 may indicate inner pack, a value of 5 may be reserved, a value of 6 may indicate unit load, a value of 7 may indicate a component, and a value of 0 may be used for all other cases.

A user may also be able to customize the serial range start and end values, which may be used to constrain the serial numbers generated by the system. For example, a user may specify that the serial number range may go from 100 to 300,000, or may be provided over another range such as may be desired.

Looking next at exemplary FIG. 8C, a format settings interface component 808 may be provided. In a format settings interface component 808, a user may be shown information and settings that may be related to formats used in the printing process. For example, according to an exemplary embodiment, the user may be able to specify a folder in which formats are kept (in this case "formats") that the system will access when using a format selector 318. In an exemplary embodiment, one or more of the files stored in the format folder may be displayed in a separate box, indicating that they have been successfully loaded from the format folder. One or more variable fields associated with the formats may also be displayed.

In an exemplary embodiment, one or more ID numbers associated with one or more formats may also be provided. This information may be used as a key for serialization of the formats, if desired.

Figure 8D:
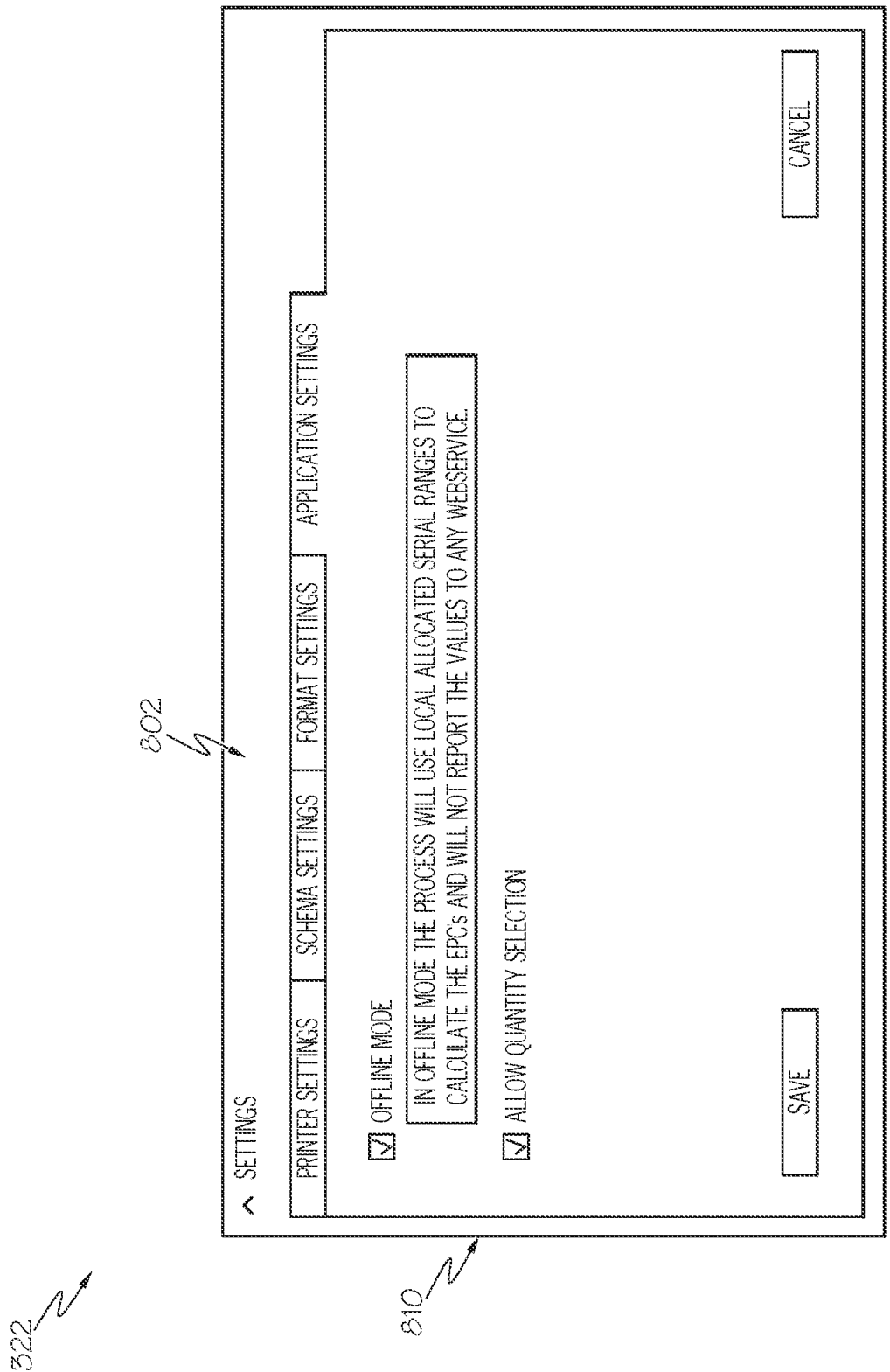
FIG. 8D is an exemplary embodiment of a settings menu interface of a label printing system.

Looking next at exemplary FIG. 8D, an application settings interface component 810 may be provided. In an exemplary embodiment of an application settings interface 810, one or more components of the interface (such as, for example, a quantity selection) may be enabled or disabled, or otherwise customized. In some exemplary embodiments, other settings, such as whether the system may be provided in an online or offline mode, may be provided; according to an exemplary embodiment, when the system is provided in an online mode, the system may be configured to report one or more values to a serialization manager service or other service, while in an offline mode, the user may be limited to exporting data manually.

Figure 9B:
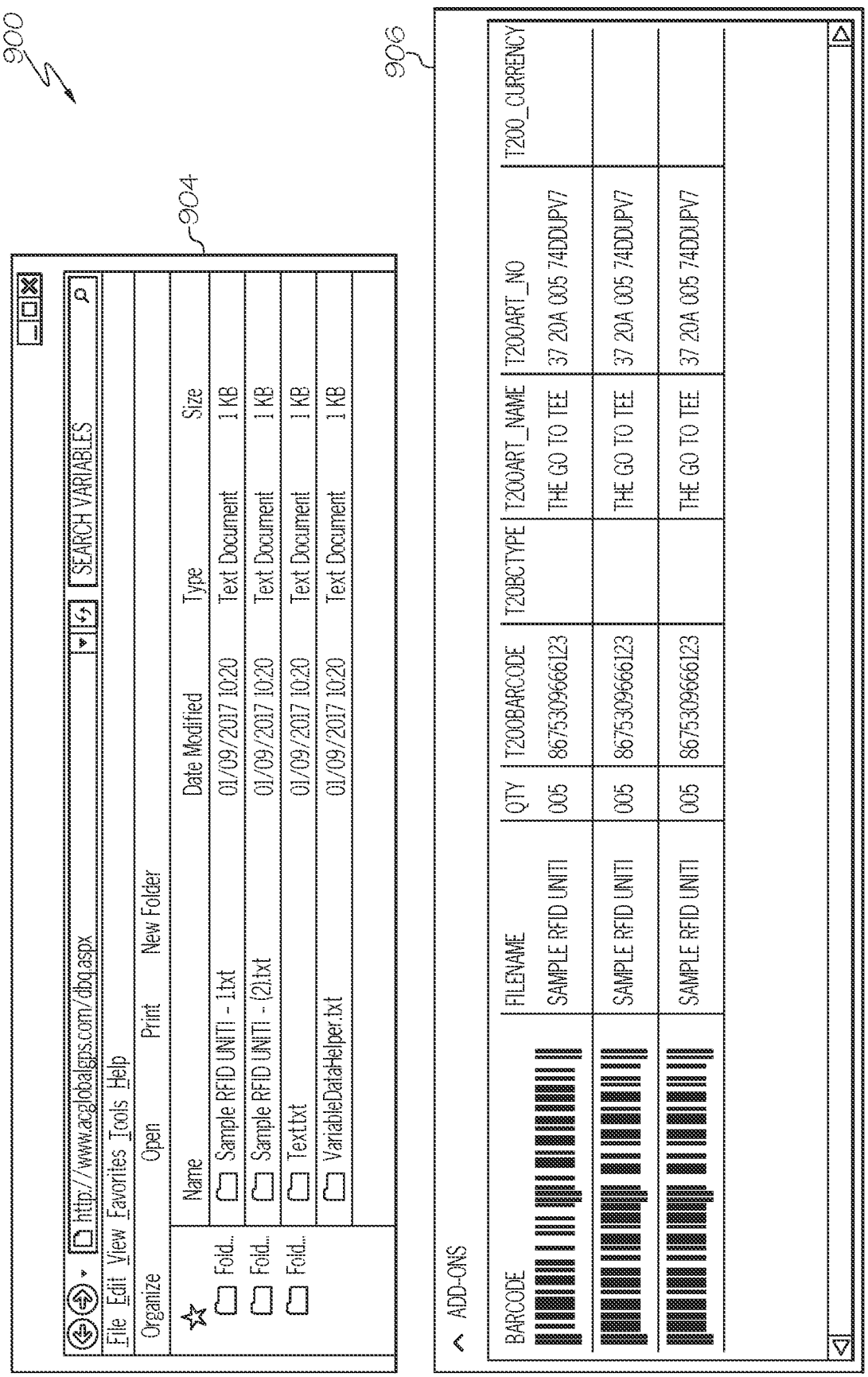
FIG. 9B is an exemplary embodiment of a variable data module interface of a label printing system.

Looking next at exemplary FIG. 9, FIG. 9 depicts a variable data add-on 900 that may be integrated with the system. In some exemplary embodiments, the system may be modular and able to accept one or more add-ons, which may be customized by a user, for example through a settings menu 322 or when initially configuring the system.

In an exemplary embodiment, a variable data add-on 900 or module may allow variable data to be used in the printing process. For example, in some exemplary embodiments, it may be desired to add additional information to the labels than would be gained from scanning the barcode; this information may include, for example, attributes of the product (such as size or color of the product) or may include other information (such as the purchase order (PO) number of the product), such as may be desired. A variable data module 900 may be configured to extract the variable data values from a data file, and transfer these values onto the label during the printing process.

In an exemplary embodiment, data definitions and content may be loaded from one or more data files. In an exemplary embodiment, the locations, types, and extensions of these data files may be modified from a module configuration screen such as module configuration screen 902; in some exemplary embodiments, this module configuration screen 902 may be made available by, for example, selecting a button in the settings menu 322, or may otherwise be accessed by a user.

In an exemplary embodiment of a module configuration screen such as module configuration screen 902, one or more data files (such as "Sample RFID (2).txt") may be provided, along with one or more attributes of these data files (such as, for example, the quantity of entries listed in each data file).

In an exemplary embodiment, a user may be able to load an additional data file; this may be done through, for example, selecting an option on a module configuration screen 902 to load a new data file or creating a new blank entry in the module configuration screen 902. This may launch a selection screen 904 through which the user can load the new data file. (Alternatively, a user may be able to add a new data file by, for example, dragging the data file into an appropriate folder or dragging the data file onto the module configuration screen 902, or through another operation such as may be desired.) This may update the module configuration screen 906 to include the new file.

For example, according to an exemplary embodiment of a variable data module 900, it may be desirable to load, delete, or change variable data files while using the application, on the fly. In an exemplary embodiment, when a file is modified or added in the variable data folder, the module configuration screen 902 may automatically update to include these changes, loading in a new data file if one has been added. This module may thus allow for data modifications without affecting the original file content, during the printing process.

FIG. 10 shows the result of such an addition in more detail. On an exemplary module configuration screen 1000 of a variable data module, a new entry may be shown in blue, indicating that it has been newly added. As shown in FIG. 10, an exemplary module configuration screen 1000 may show barcode information 1002 for which variable data is to be associated, filename information 1004 for a variable information file, a quantity of entries 1006, a barcode number 1008, a barcode type 1010 (for example, if the system is configured to use multiple barcode types), and a name 1012 and number 1014 associated with the entry, or any other information such as may be desired.

Turning now to FIG. 11, FIG. 11 may show an exemplary embodiment of a label that may be generated by the system, generated in a test format.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of using a label printing system, the method comprising:
    inputting a barcode value;
    based on the barcode value, generating a corresponding RFID label with associated label information for a product;
    extracting variable data and combining the variable data with the label information; and
    printing and encoding a first label having the label information and the variable data; and
    printing and encoding a second label having the label information and the variable data.

2. The method of claim 1, further comprising starting a process, wherein starting the process further comprises activating a label printing system and initiating an interface.

3. The method of claim 1, wherein the value is inputted by scanning a barcode with a scanner that is communicatively coupled with the label printing system.

4. The method of claim 1, wherein the value is inputted manually.

5. The method of claim 1, wherein the method further comprises storing values in print history.

6. The method of claim 5, wherein the values are stored locally or provided to a product tracking database.

7. The method of claim 1, wherein the variable data includes information relating to a consumer product.

8. The method of claim 7, wherein the consumer product is an article of clothing.

9. The method of claim 7, wherein the variable data includes at least one of size or color of the consumer product.

10. The method of claim 1, further comprising:
    preventing an additional label from being printed based on the type of product, the variable data, and the quantity of labels that have already been printed using the label printing system.

11. The method of claim 1, further comprising:
    preventing a label type from being printed and encoded based on a type of product associated with the barcode value, the variable data, and an incompatibility of the type of product with the label type.

12. A method for processing barcode information provided by a user or print and encode RFID-enabled labels, the method comprising:
    starting a process by initiating a variable data add-on;
    loading at least one variable data file;
    determining if a file has been changed, deleted or added in the at least one variable data file;
    updating the at least one variable data file;
    entering or scanning a barcode;
    associating the barcode with a product or data and determining if any variable information corresponds to the barcode and if there is, retrieving the variable information;
    compiling label data including the variable information; and
    printing and encoding the labels,
    wherein scanning the barcode comprises automatically displaying barcode lines so that a user may visually compare the barcode on a label to a barcode on a screen.

13. The method of claim 12, wherein updating the at least one variable data file includes loading any new set of variable data files and continuing variable data add-on process.

14. The method of claim 12, wherein the label data comprises the at least one variable data file, and type and quantity of labels.

15. The method of claim 12, wherein the method further comprises ending the method and looping back to the start if more barcodes are entered by a user.

16. The method of claim 12, wherein scanning the barcode comprises automatically displaying barcode lines behind a barcode field.

* * * * *